(12) United States Patent
Sorensen

(10) Patent No.: US 11,083,124 B2
(45) Date of Patent: Aug. 10, 2021

(54) SCRAPER BLADE FOR DEPTH-GAUGE WHEEL

(71) Applicant: Douglas D. Sorensen, Audubon, IA (US)

(72) Inventor: Douglas D. Sorensen, Audubon, IA (US)

( * ) Notice: Subject to any disclaimer, the term of this patent is extended or adjusted under 35 U.S.C. 154(b) by 269 days.

(21) Appl. No.: 16/377,451

(22) Filed: Apr. 8, 2019

(65) Prior Publication Data

US 2019/0230844 A1 Aug. 1, 2019

Related U.S. Application Data

(63) Continuation-in-part of application No. 15/784,998, filed on Oct. 16, 2017, now abandoned.

(60) Provisional application No. 62/409,031, filed on Oct. 17, 2016.

(51) Int. Cl.
*A01B 71/08* (2006.01)
*A01C 7/20* (2006.01)

(52) U.S. Cl.
CPC .............. *A01B 71/08* (2013.01); *A01C 7/203* (2013.01)

(58) Field of Classification Search
CPC ...... B60S 1/62; B60S 1/66; B60S 1/68; A01B 71/08; A01C 7/203
See application file for complete search history.

(56) References Cited

U.S. PATENT DOCUMENTS

| 501,917 | A | * | 7/1893 | Caldwell | A01B 23/06 172/558 |
| 773,595 | A | * | 11/1904 | Robinson | B60S 1/68 280/855 |
| 778,123 | A | * | 12/1904 | Fetzer | A01C 5/068 172/538 |
| 2,155,739 | A | * | 4/1939 | Seaholm | A01B 15/16 172/558 |
| 2,571,285 | A | * | 10/1951 | Oehler | A01C 5/068 280/856 |
| 2,770,469 | A | * | 11/1956 | Seda | A01B 71/08 280/855 |
| 2,949,968 | A | * | 8/1960 | Stoner | A01B 15/18 172/166 |
| 5,269,380 | A | * | 12/1993 | Lofquist et al. | A01C 5/068 172/558 |
| 5,443,125 | A | * | 8/1995 | Clark et al. | A01B 71/08 15/256.5 |
| 5,884,711 | A | | 3/1999 | Shoup | |

(Continued)

FOREIGN PATENT DOCUMENTS

FR 2580453 A1 * 10/1986 ............. A01B 71/08

*Primary Examiner* — Tara Mayo-Pinnock
(74) *Attorney, Agent, or Firm* — Zarley Law Firm, P.L.C.

(57) ABSTRACT

A scraper blade for a row unit of a planter. The scraper blade has a connecting portion that connects to the pivot hub of a depth-gauge assembly. The connecting portion connects to a blade portion. The blade portion is positioned in a gap formed between the pivot hub and the contact surface of the depth-gauge wheel. The scraper blade is connected to the depth-gauge assembly in a static and stationary position at a pivot point. As a pivot arm and the depth-gauge wheel move about in relation to the pivot point, the scraper blade maintains a fixed position at close tolerances with the depth-gauge wheel to remove soil and debris from the depth-gauge wheel.

20 Claims, 7 Drawing Sheets

(56) References Cited

U.S. PATENT DOCUMENTS

| | | | | |
|---|---|---|---|---|
| 7,730,962 B1* | 6/2010 | Kester | .................... | A01C 5/068 |
| | | | | 172/558 |
| 8,960,322 B2* | 2/2015 | Kester | .................... | A01B 35/20 |
| | | | | 172/558 |
| 9,872,423 B2* | 1/2018 | Anderson et al. | ..... | A01C 5/068 |
| 2012/0192774 A1* | 8/2012 | Hesla | .................... | A01C 5/068 |
| | | | | 111/163 |
| 2017/0000014 A1* | 1/2017 | Anderson et al. | ..... | A01C 5/068 |

* cited by examiner

SCRAPER BLADE FOR DEPTH-GAUGE WHEEL

CROSS REFERENCE TO RELATED APPLICATION

This application is a continuation-in-part of U.S. Ser. No. 15/784,998 filed on Oct. 16, 2017, which claims the benefit of the priority of U.S. Provisional Ser. No. 62/409,031 filed on Oct. 17, 2016, the contents of these applications are hereby incorporated by reference in their entirety.

BACKGROUND OF THE INVENTION

This invention is directed to a scraper blade. More specifically, and without limitation, this invention relates to a scraper blade for a depth-gauge wheel of a planter.

To achieve the highest yields from a crop, it is critical to have uniform emergence of seeds, which in turn requires the seeds be planted at a consistent depth. The depth-gauge assembly assists in achieving this uniformity. While planting, the depth-gauge wheels of the depth-gauge assembly roll along the soil surface applying a load or force that establishes the depth that seeds will be released by positioning the furrow openers at a relatively consistent depth within the soil.

To achieve the best uniform emergence, the depth-gauge wheels must be in contact with the soil surface and have a round or circular profile. During operation of the planter, however, the soil conditions are not always ideal. Rather than being dry, portions of a field have soil that is damp. Damp soil will cling to the wheel thereby causing buildup of additional soil and debris over time that alters the round profile at the periphery of the depth-gauge wheels and alters the size of the depth-gauge wheels, each of which prevents the depth-gauge wheels from contacting the surface and applying a uniform application of force during rotation. Not only does this negatively impact seed emergence, but buildup also leads to the planter bouncing during operation due to the irregularities in a depth-gauge wheel's profile and in the profile of other depth-gauge wheels of the planter.

Another associated problem with damp soil is buildup on the row unit planter. When engaging damp soil, depth-gauge wheels will dislodge some of the attached soil. The dislodged soil is ejected forwardly with enough speed to cling to or splatter on the row unit planter behind where the planter is travelling. During operation, the depth-gauge wheels are lifted upwardly and forwardly, which results in the depth-gauge wheels rubbing against the soil that has built up from being released from the depth-gauge wheel. The rubbing damages or wears on the depth-gauge wheel, which causes irregularities in the depth-gauge wheel's profile that harms uniform seed emergence and can require replacement or repair of the depth-gauge wheel.

Buildup can also lead to damage to other parts of the depth-gauge wheel assembly. For instance, as significant buildup occurs on the depth-gauge wheel it can reach the point that the accumulation of soil and debris can engage the pivot arm itself or the parts of the pivot arm causing additional wear and damage. Notably, at the point this engagement is occurring it is common for soil or debris to have added 0.75 inches or more to the exterior surface of the depth-gauge wheel's circular periphery.

Scraper blades for depth-gauge wheels are known in the art to address this problem. While useful, existing scrapers have a number of deficiencies. For instance, some current scrapers require welding to the planter, which not only harms the aesthetic of the planter but also makes replacement and repairs of the scraper blades more difficult. Other scrapers are made of multiple pieces that pose a substantial risk in becoming loose during operation thereby requiring frequent adjustment. Further, these multiple component scrapers often engage and damage the depth-gauge wheels when they are jarred out of position during operation.

Other issues exist with the positioning of existing scraper blades. Many scraper blades are attached directly to the pivot hub of the pivot arm or include a scraper arm that extends away from the pivot arm.

These problems are exemplified in the scraper blade assembly disclosed by Shoup in U.S. Pat. No. 5,884,711 ("Shoup"). As disclosed by Shoup, the scraper blade assembly connects around the pivot hub with a collar. Through this connection, the scraper blade assembly maintains a static position relative to the depth-gauge wheel during operation. Particularly, as the depth-gauge wheel is displaced upwards during operation, the scraper blade assembly maintains the same position along the circular profile due to the scraper blade assembly's free movement about the pivot hub. In this way, the movement of the depth-gauge wheel corresponds to the movement of the scraper blade assembly. During the operation of a planter using the Shoup scraper blade assembly, soil and debris such as foliage will often accumulate or hair pin between the scraper blade and the depth-gauge wheel. Absent manual removal by an operator of the planter, the buildup can lead to wear on the depth-gauge wheel thereby harming uniform emergence and in extreme instances can lead to the depth-gauge wheel stopping rotation during operation causing significant wear on the depth-gauge wheel.

Shoup also discloses the use of a scraper arm that extends away from the pivot hub. Scraper arms risk adding an additional point of fault as the scraper arm can become loose, bent, or otherwise damaged. The inclusion of the scraper arm also reduces the leverage the scraper blade assembly has when engaging accumulated soil and debris. The reduction in leverage increases the likelihood of the scraper blade assembly being dislodged, damaged, or loosened, thereby severely inhibiting the scraper blade assembly's removal of accumulated soil and debris from the depth-gauge wheel.

Thus it is a primary objective of this invention to provide a scraper blade for a depth-gauge wheel that improves upon the art.

An objective of the present invention is to provide a scraper blade made of few parts.

Another objective of the present invention is to provide a scraper blade that does not require frequent adjustment.

A still further objective of the present invention is to provide a scraper blade that does not damage a depth-gauge wheel.

Another objective of the present invention is to provide a scraper blade that self-cleans soil and debris buildup on the scraper blade.

A still further objective of the present invention is to provide a scraper blade that uses existing connection parts from a planter.

Another objective of the present invention is to provide a scraper blade that maintains a static position relative to the pivot point and not in relation to the depth-gauge wheel.

A still further objective of the present invention is to provide consistent and superior leverage to a scraper blade for reduced jarring of a scraper blade.

These and other objectives, features, and advantages of the invention will become apparent from the specification and claims.

SUMMARY OF THE INVENTION

In general, the present invention relates to a scraper blade that removes soil and debris from a depth-gauge wheel of a row unit on a planter. The scraper blade has a connecting portion that is connected to the depth-gauge assembly using an attaching stud passed through an aperture in the connecting portion. The attaching stud can come from the existing parts of the depth-gauge wheel. During operation of the planter, the attaching stud functions as a pivot point about which a pivot arm and the depth-gauge wheel moves.

Connected to the connecting portion is a blade portion that is sized and shaped to fit within a gap formed between the depth-gauge wheel and the pivot hub of the depth-gauge assembly. By connecting the scraper blade at the pivot point and positioning the blade portion in the gap, the blade portion remains static and stationary while the depth-gauge wheels move dynamically about the pivot point.

The scraper blade is formed by a connection between the connecting portion and the blade portion, both of which have a flat, planar profile. In some embodiments of the present invention, the connecting portion and the blade portion are welded together. In this way, the scraper blade is made of a single part that can be attached to the depth-gauge assembly using parts already available on the depth-gauge assembly.

The blade portion is sized and shaped to have a similar contour as the gap. This provides close tolerances between the blade portion and the depth-gauge assembly, which in turn provides superior removal of soil and debris from the depth-gauge wheel while simultaneously limiting the likelihood of buildup or hair pinning of soil and debris about the scraper blade. Likewise, the connecting portion in some arrangements has a size and shape that is similar to the pivot hub to avoid the accumulation of soil and debris.

In the event of buildup on the scraper blade, the static and stationary attachment to the pivot point results in buildup being removed by the depth-gauge wheel. This is accomplished by the depth-gauge wheel returning to its non-operational position, which "kicks off" any buildup.

When attached to the depth-gauge assembly, the blade portion extends such that the maximum amount of leverage is provided to the scraper blade and close tolerances are maintained with the depth-gauge wheel. This limits the amount of jarring that can occur to the scraper blade while allowing for the maximum scraping of depth-gauge wheel without causing damage to the depth-gauge wheel.

In some embodiments of the present invention, the blade portion has a first blade portion and a second blade portion that are adjustably connected to one another. In this way, the second blade portion can be adjusted laterally from the first blade portion to set a position to match the contour of the depth-gauge wheel.

DETAILED DESCRIPTION

Figure 1:
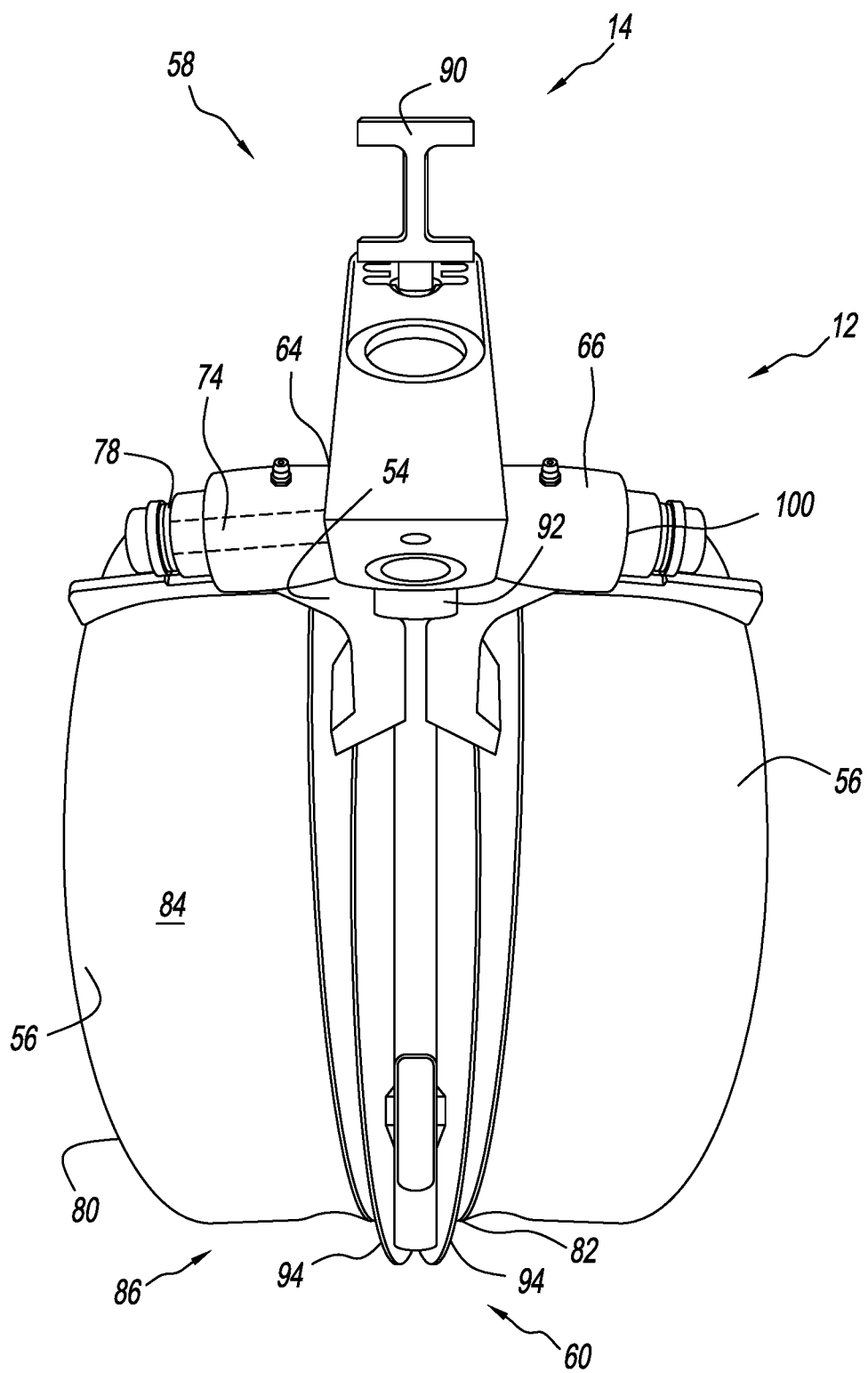
FIG. 1 is a side and cross-section view of a prior art depth-gauge assembly.

With reference to the Figures, a scraper blade 10 is shown for use in association with a pre-existing depth-gauge assembly 12 of a row unit 14 for a planter 16.

The scraper blade 10 has a blade portion 18 and a connecting portion 20. The blade portion 18 and the connecting portion 20 are connected to each other in a generally perpendicular angle to form a T-shape. In one embodiment, the blade portion 18 and the connecting portion 20 are welded to each other, but in other embodiments the scraper blade 10 is monolithically produced with a single, uniform body. This eliminates numerous points of failure in the scraper blade 10 and eliminates repeated adjustment of the scraper blade 10.

The blade portion 18 has a front surface 22 and a back surface 24 with a top edge 26, a bottom edge 28, a first side edge 30, and a second side edge 32 that extend around the front surface 22 and the back surface 24. As shown in the exemplary embodiment, the blade portion 18 has a generally flat and planar profile formed by the front surface 22 and the back surface 24.

As shown in the exemplary embodiments, the top edge 26 extends from the first side edge 30 to the second side edge 32. In some arrangements, the top edge 26 curves to the first side edge 30 and slopes or curves to the second side edge 32.

The bottom edge 28 has a contour 34, which in some embodiments includes a concave portion 36 and a convex portion 38—the concave portion 36 curves towards the top edge 26 such that the blade portion 18 narrows and the convex portion 38 curves away from the top edge 26. In this way, the contour 34 resembles an elongated "S". For example, as seen in FIG. 3, the concave portion 36 extends from the first side edge 30 to the convex portion 38, and the convex portion 38 extends to the second side edge 32.

In one arrangement, the contour 34 of the bottom edge 28 and the curve of the top edge 26 converge in a point 40, which negates the presence of the second side edge 32.

The connecting portion 20 has a front surface 42 and a back surface 44. In the exemplary embodiment of the Figures, the connecting portion 20 has an edge 46 that extends around or substantially around the front surface 42 and back surface 44. As shown in the exemplary embodiment, the connecting portion has a generally flat and planar profile formed by the front surface 42 and the back surface 44.

Figure 3:
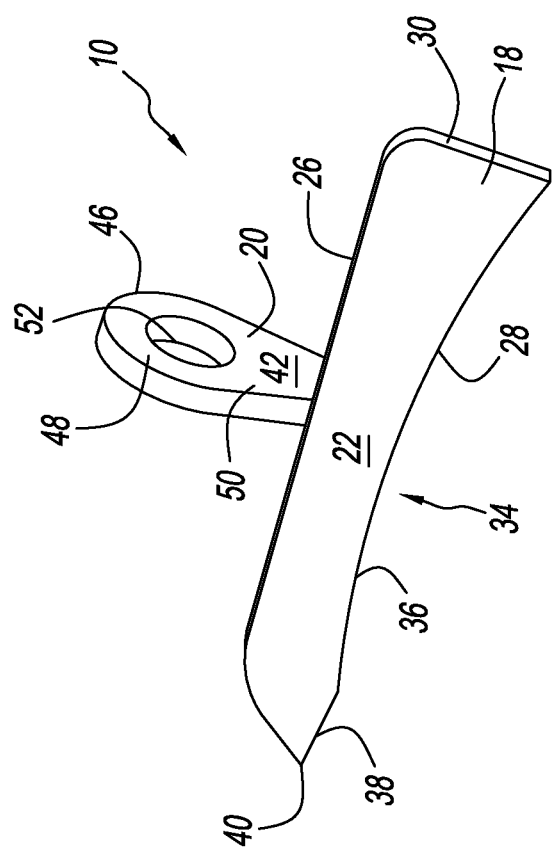
FIG. 3 is a perspective view of a scraper blade.

As shown in FIG. 3, the connecting portion 20 resembles a tear drop such that the edge 46 of the connecting portion 20 forms a rounded portion 48 and a narrowing portion 50 of the connecting portion 20, wherein the edge 46 narrows from the rounded portion 48 to the narrowing portion 50. The narrowing portion 50 directly connects to the top edge 26 of the blade portion 18.

The connecting portion 20 has an aperture or opening 52, which in some arrangements is positioned through the front surface 42 and the back surface 44 within the rounded portion 48 of the edge 46.

Figure 2:
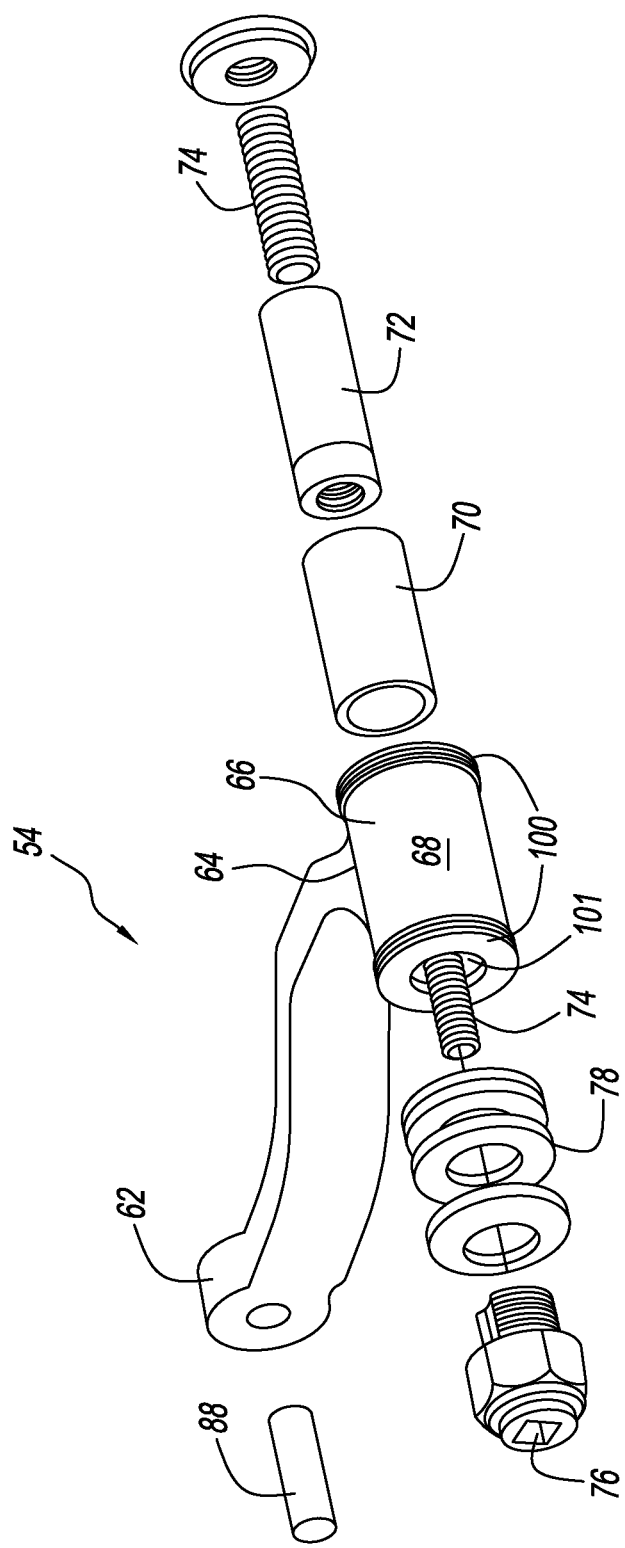
FIG. 2 is an exploded view of a prior art pivot arm.

The depth-gauge assembly 12 as depicted in FIGS. 1 and 2 is of an arrangement and design known in the art. The depth-gauge assembly 12 has one or more pivot arms 54, one or more depth-gauge wheels 56, a depth stop 58, and one or more furrow openers 60.

The pivot arm 54 extends from a first end 62 to a second end 64. The pivot arm 54 connects to a depth-gauge wheel 56 at the first end 62. A pivot hub 66 is connected to the pivot arm 54 at the second end 64. As known in the art, the pivot hub 66 is monolithically constructed with the pivot arm 54 by casting. The pivot hub 66 has an exterior surface or periphery 68.

In some arrangement, within the pivot hub 66 is a bushing 70, a pivot shaft 72, and an attaching stud 74 that allows the pivot hub 66 to pivotally or rotatably connect to row unit 14. The pivot hub 66 pivots about a pivot point 76 that is generally defined by the center point of the attaching stud 74. The attaching stud 74 is fixedly connected to the row unit 14 using one or more washers 78 such that the attaching stud 74 does not pivot or move during operation of the planter 16.

The depth-gauge wheel 56 has a front surface 80 and a back surface 82 with a rounded exterior contact surface 84 that is formed by the periphery extending between the front surface 80 and the back surface 82. The contact surface 84 has a contour 86. The contour 34 of the bottom edge 28 of the blade portion 18 matches the contour 86 of the contact surface 84 in some arrangements. The depth-gauge wheel 56 connects to the pivot arm 54 by a connection member 88, such as a bolt or axle.

The depth stop 58 has a handle 90 that connects to a fulcrum 92. The depth stop 58 is connected to the pivot arm 54 as described further herein. The furrow opener or openers 60 are positioned between and often set apart from the depth-gauge wheel or wheels 56 on the row unit 14. The furrow openers 60 in some embodiments comprise a pair of discs 94. The pair of discs 94 converge towards each other as the pair of discs 94 extend downwards toward a ground of soil surface 98—in this way the pair of discs 94 have a general "V" shape with respect to each other.

During operation of the planter 16 the pivot arms 54 allow the depth-gauge wheels 56 that are positioned on opposing sides of each row unit 14 to move up and down independently of each other as irregular surfaces, such as clods, depressions, ridges, gullies, and other features that are encountered on the soil surface 98. When an irregular surface is encounter by one depth-gauge wheel 56, the fulcrum 92 of the depth stop 58 applies force to the opposite depth-gauge wheel 56. Simultaneously, the furrow openers 60 are penetrating the soil surface 98 and the degree of this penetration is limited by the position of the depth-gauge wheels 56. In this way, the furrow openers 60 are permitted to penetrate the soil surface by the average position of the depth-gauge wheels 56. This is turn allows for uniform seed emergence.

To assemble, the attaching stud 74 is removed from the pivot hub 66. More particularly, the attaching stud 74 has a pair of ends 100 that are positioned on each side of the circumference of the pivot hub 66 with the attaching stud 74 extending through an aperture 101 of the pivot hub 66 that extends through the pair of ends 100. Once removed, the attaching stud 74 is then passed through the aperture 52 in the connecting portion 20 of the scraper blade 10. Washers 78 are also added or removed to the attaching stud 74. The addition of the washers 78 are used in some arrangements to align the contour 34 of the bottom edge 28 of the blade portion 18 with the contour 86 of the depth-gauge wheel 56. The attaching stud 74 is then reinserted into the pivot hub 66 and fastened tightly such that neither the attaching stud 74 nor the scraper blade 10 move when the pivot arm 54 is moved about the pivot point 76, i.e., the scraper blade 10 remains in a static and stationary position. In this way, the connecting portion 20 is parallel or substantially parallel to the pair of ends 100 of the pivot hub 66. Once secured, the scraper blade 10 will not become loose, nor require further adjustment. In some embodiments, the size of the rounded portion 48 of the connecting portion 20 is the same size as or smaller than the diameter of the pivot hub 66 to eliminate areas for debris and soil to accumulate.

Figure 4:
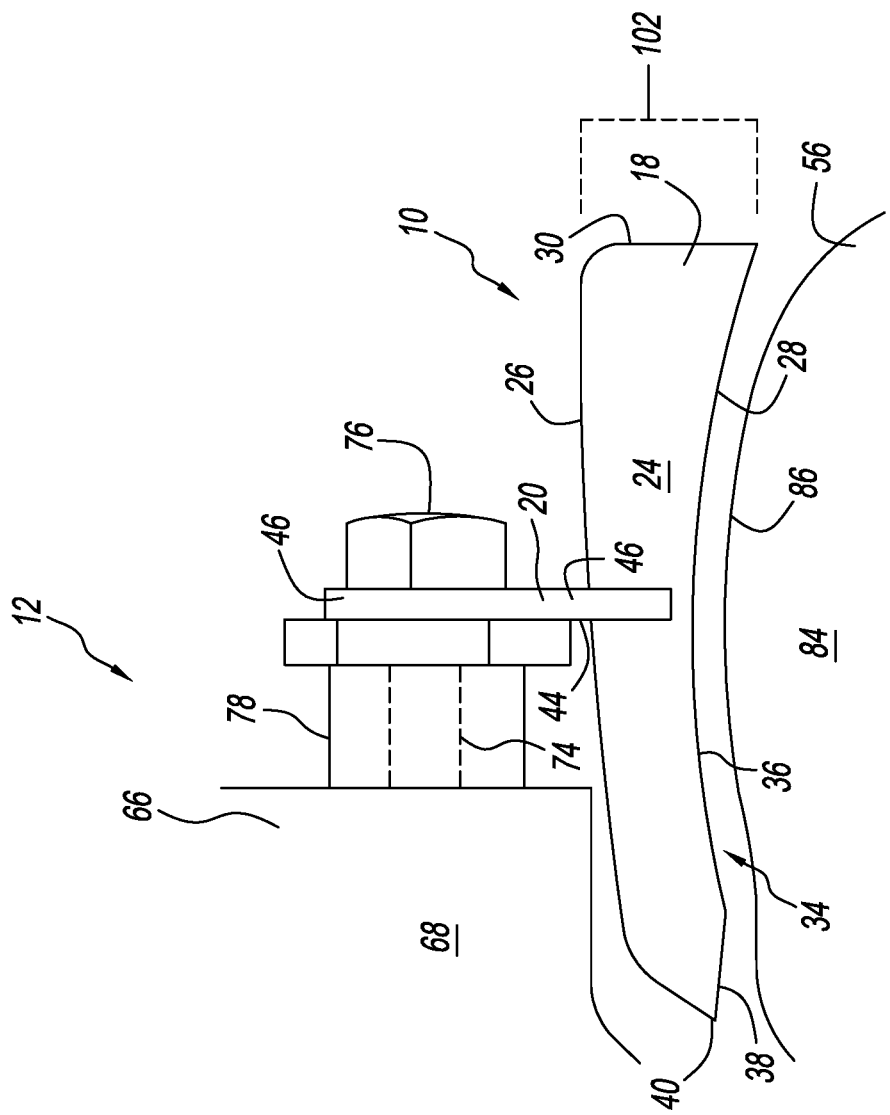
FIG. 4 is a side view of a scraper blade mounted to a depth-gauge assembly.
Figure 5:
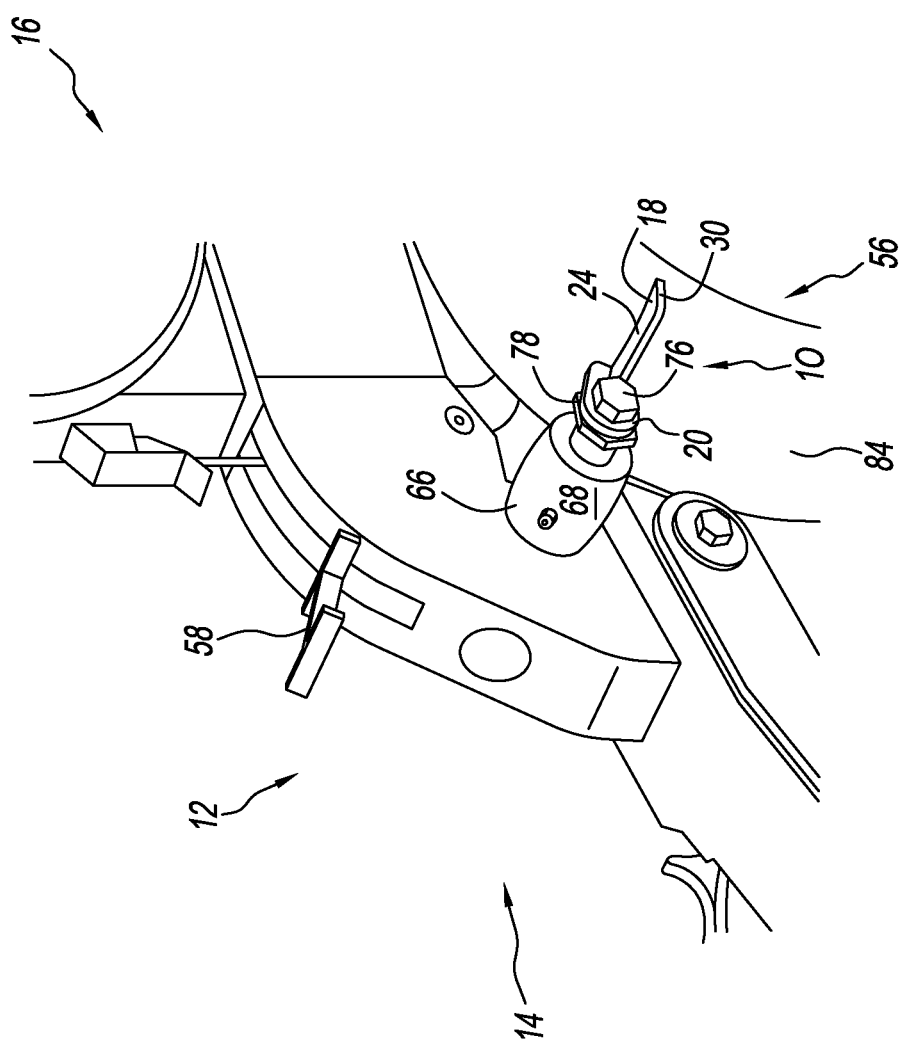
FIG. 5 is a perspective view of a scraper blade mounted to a depth-gauge assembly.
Figure 6:
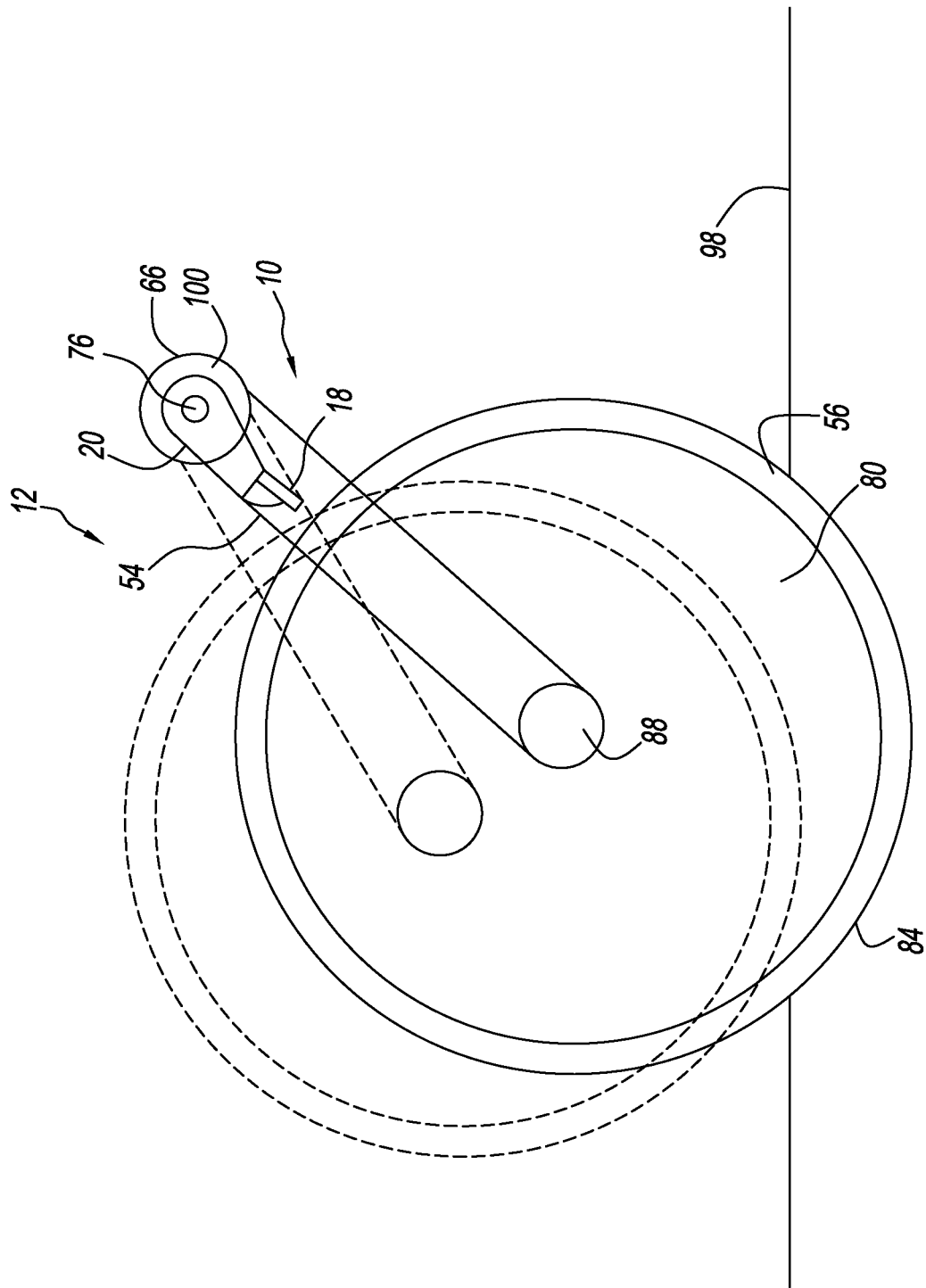
FIG. 6 is a side view of a scraper blade having a static and stationary position about a pivot point when mounted to a depth-gauge assembly.

Once attached to the depth-gauge assembly 12 as seen in FIGS. 4-6, the scraper blade 10 will at least partially extend into and within a gap or space 102 formed between the pivot hub 66 and the depth-gauge wheel 56. More specifically, the gap 102 is formed and positioned between the shortest distance between the exterior surface 68 of the pivot hub 66 and the exterior contact surface 84 of the depth-gauge wheel 56. In some embodiments, the gap 102 is near, within 0.5 inches, of the shortest distance between the exterior surface 68 of the pivot hub 66 and the exterior contact surface 84 of the depth-gauge wheel 56. The gap 102 is the only location where the blade portion 18 can remain in a static and stationary position while maintaining a constant distance between the bottom edge 28 of the blade portion 18 and the exterior contact surface 84 of the depth-gauge wheel 56 regardless of the position of the depth-gauge wheel 56 along the path of rotation permitted by the pivot arm 54 about the pivot point 76 as shown in FIG. 6. Put differently, the position and size of the scraper blade 10 does not change as the pivot arm 54 moves. For example, the gap 102 on John Deere planters 16 for instance has a size of approximately 0.75 inches.

The distance between the top edge 26 and the bottom edge 28 of the blade portion 18 is such that blade portion 18 is within close tolerances of the exterior surface 68 of the pivot hub 66 and the exterior contact surface 84 of the depth-gauge wheel 56 thereby preventing the scraper blade 10 from causing damage or wear to the depth-gauge wheel 56. In one embodiment, the blade portion 18 is positioned 0.125 inches from the exterior surface 68 of the pivot hub 66 and 0.125 inches from the exterior contact surface 84 of the depth-gauge wheel 56. At this distance, the scraper blade 10 can remove soil and debris without contacting the pivot hub 66 or the depth-gauge wheel 56 while permitting enough distance to limit the amount of soil and debris that can be caught between the scraper blade 10 and either the pivot hub 66 or the depth-gauge wheel 56. Also, at closer tolerances the potential for contact between the scraper blade 10 and the depth-gauge wheel 56 or the pivot hub 66 increases due to manufacturing inconsistencies with the depth-gauge wheel 56 and pivot hub 66, which may not be perfectly round.

In some arrangements, the blade portion 18 is positioned within the gap 102 by the length of the connecting portion 20 and the position of the aperture 52 in the connecting portion 20. When assembled onto the attaching stud 74, the connecting portion 20 is connected to the blade portion 18 so that the connecting portion 20 extends to the top edge 26. As shown in the exemplary embodiments, the blade portion 18 is configured to maintain a substantially consistent distance from the pivot hub 66 and washers 78 and a consistent distance away from the contour 86 of the exterior contact surface 84 of the depth-gauge wheel 56. In some embodiments, this is accomplished by at least a part of the blade portion 18 extending from the connecting portion 20 inwards toward the pivot arm 54. As shown in FIG. 3, the point 40 formed by the convergence of the top edge 26 and the bottom edge 28 permits the distances between the blade portion 18 to be maintained with relation to the pivot hub 66 and the depth-gauge wheel 56. This is also facilitated in some arrangements by the bottom edge 28 having the contour 34 that matches the contour 86 of depth-gauge wheel 56. In some embodiments, the blade portion 18 also extends from the connecting portion 20 outwards from the pivot arm 54.

During operation with the scraper blade 10 assembly, the scraper blade 10 removes debris and soil without engaging the pivot hub 66 and the depth-gauge wheel 56. The close tolerances with the depth-gauge wheel 56 are maintained as the scraper blade 10 remains in a static position as the depth-gauge wheel 56 moves dynamically about the pivot point 76 as the soil surface 98 is engaged. While positioned in the gap 102, the scraper blade 10 applies the optimal leverage as scraper blade 10 is engaging any accumulated soil and debris perpendicularly. This arrangement also limits the potential for buildup of soil and debris on the scraper blade 10. In comparison, other scraper assemblies known in the art are positioned away from a perpendicular arrangement thereby limiting the ability of such scraper blade assemblies from removing soil and debris as efficiently and with an increased likelihood of damaging not only the scraper blade 10 assembly but the depth-gauge wheel 56 as well.

In the event of a buildup of soil or debris on the scraper blade 10, the static position of the scraper blade 10 results in the removal of the buildup when the depth-gauge wheels 56 lowering at the end of operation. More particularly, during operation the depth-gauge wheels 56 move upwards and forwards of the planter 16 when the soil surface 98 is engaged. As shown in FIG. 6, at the end of operation or any time the depth-gauge wheel 56 returns to a non-operational position or moves downwards and rearwards, the depth-gauge wheel 56 engages any buildup and removes it from the scraper blade 10.

Figure 7:
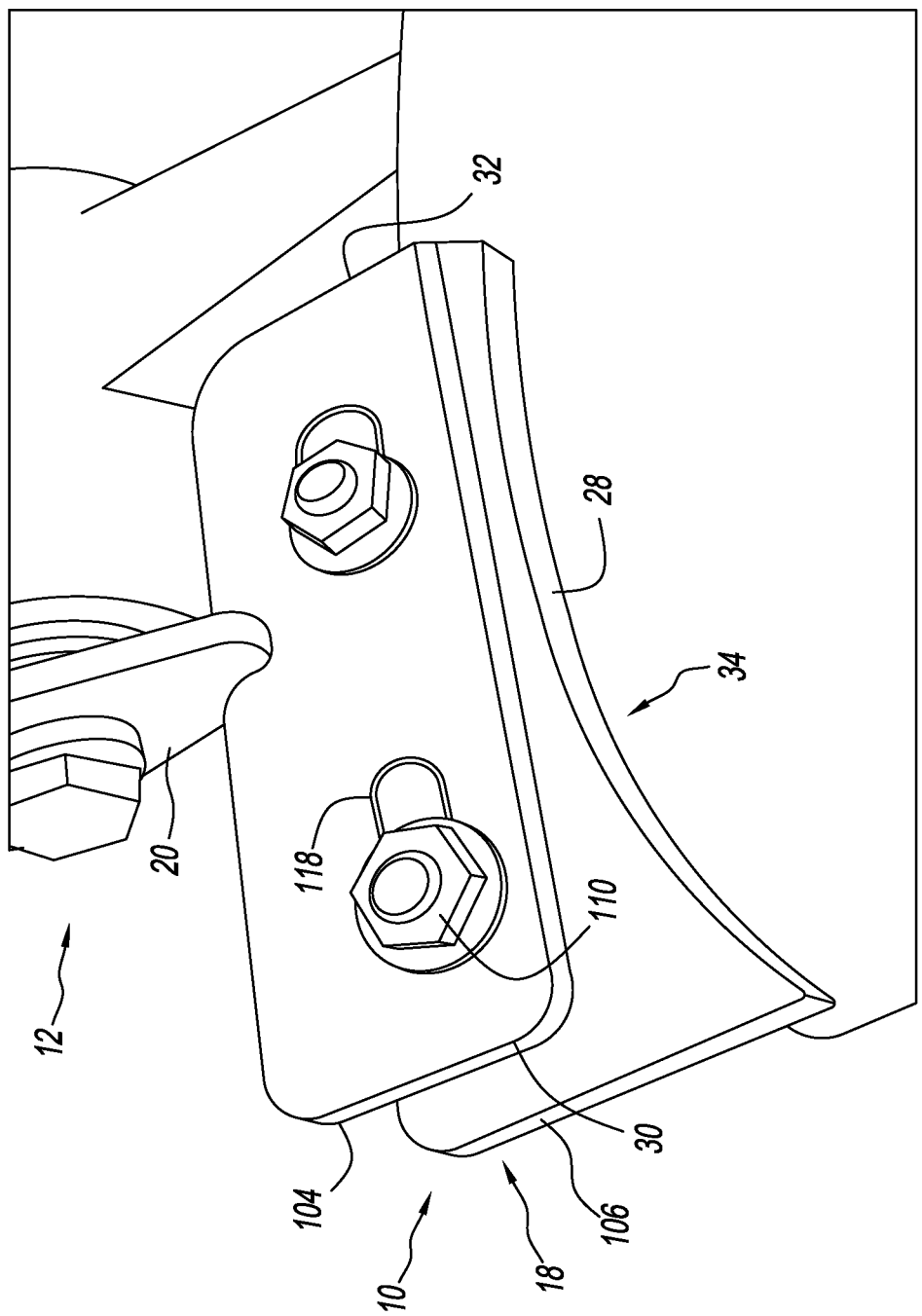
FIG. 7 is a side view of a scraper blade mounted to a depth-gauge assembly.

In one embodiment of the present invention and shown in FIG. 7, the blade portion 18 comprises a first blade portion 104 and a second blade portion 106. The first blade portion 104 and second blade portion 106 are in a staggered and stacked flush engagement with one another and extend in otherwise parallel-spaced alignment. The first blade portion 104 is connected to the connecting portion 20 as disclosed herein. The second blade portion 106 is connected to the first blade portion 104 by aligning one or more openings 108 in the first blade portion 104 and the second blade portion 106 that receive a bolt or other connecting member 110 to fasten the first blade portion 104 and the second blade portion 106 together. The second blade portion 106 has a bottom edge 28 with the contour 34 that scrapes soil and debris from the depth-gauge wheel 56. In this embodiment, the openings 108 are laterally elongated to permit adjustment of the position of the second blade portion 106 to one side or the other between the front surface 80 and back surface 82 of the depth-gauge wheel 56 when attached to depth-gauge assembly 12. In this way the second blade portion 106 can be adjusted laterally using the elongated openings 108 to align the contour 34 of the blade portion 18 to the contour 86 of the depth-gauge wheel 56.

Therefore, a scraper blade 10 has been provided that has few parts, does not require frequent adjustment, does not damage a depth-gauge wheel 56, self-cleans soil and debris buildup on the scraper blade 10, uses existing connection parts from a planter 16 to attach, maintains a static position relative to the pivot point 76 and not in relation to the depth-gauge wheel 56, reduces jarring of a scraper blade 10, and improves upon the art.

From the above discussion and accompanying figures and claims it will be appreciated that the scraper blade 10 offers many advantages over the prior art. It will be appreciated further by those skilled in the art that various other modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A scraper blade for a depth-gauge assembly, comprising:
   a connecting portion having an aperture;
   a blade portion connected to the connecting portion; and
   wherein the connecting portion and the blade portion are configured to attach to a depth-gauge assembly such that the blade portion is positioned in a gap formed between a pivot hub and a depth-gauge wheel of the depth-gauge assembly;
   wherein the connecting portion is configured to be statically attached to the depth-gauge assembly at a pivot point by which a pivot arm rotates such that wherein when the pivot arm moves in relation to the pivot point, the connecting portion and the blade portion do not change position in relation to the pivot point.

2. The scraper blade of claim 1 wherein the blade portion is connected to the connecting portion at a generally perpendicular angle to form a T-shape.

3. The scraper blade of claim 1 wherein the blade portion has a front surface and a back surface with a top edge, a bottom edge, and a side edge, and a second side edge wherein the blade portion has a flat planar profile formed between the front surface and the back surface, and the connecting portion has a front surface and a back surface wherein the connecting portion has a flat planar profile formed between the front surface and the back surface.

4. The scraper blade of claim 3 further comprising the blade portion having a point opposite the side edge that is formed by the convergence of the top edge and the bottom edge.

5. The scraper blade of claim 3 wherein the bottom edge of the blade portion has a contour, wherein the contour has a concave portion and a convex portion.

6. The scraper blade of claim 1 wherein the connecting portion is configured to attach to the depth-gauge assembly with an attaching stud received in the pivot arm such that wherein when attached the connecting portion is substantially parallel to an end of the pivot hub.

7. The scraper blade of claim 1 wherein when the connecting portion is connected to the pivot arm, the blade portion extends at least partially into the gap.

8. The scraper blade of claim 1 wherein the gap is formed and positioned between the shortest distance between an exterior surface of the pivot hub and an exterior contact surface of the depth-gauge wheel.

9. The scraper blade of claim 1 wherein the gap is formed within 0.5 inches of a position between the shortest distance between an exterior surface of the pivot hub and an exterior contact surface of the depth-gauge wheel.

10. The scraper blade of claim 1 wherein the gap is approximately 0.75 inches in length.

11. The scraper blade of claim 1 wherein the blade portion is configured to be positioned within the gap such that a top edge of the blade portion is approximately 0.125 inches from the pivot hub and a bottom edge of the blade portion is approximately 0.125 inches from an exterior contact surface of the depth-gauge wheel, and the static attachment of the scraper blade maintains the blade portion at a substantially consistent distance from the exterior contact surface thereby preventing the blade portion from contacting the exterior contact surface of the depth-gauge wheel.

12. The scraper blade of claim 1 wherein the blade portion is configured to at least partially extend below the pivot hub and towards a pivot arm of the depth-gauge assembly.

13. The scraper blade of claim 1 wherein the blade portion has a first blade portion and a second blade portion that are connected to one another by connection members received in elongated openings in the first blade portion and the second blade portion.

14. The scraper blade of claim 13 wherein the first blade portion and second blade portion are in a staggered and stacked flush engagement with one another and extend in otherwise parallel-spaced alignment.

15. The scraper blade of claim 13 wherein the elongated openings are configured to allow selective adjustment of the distance the second blade portion extends away from the first blade portion.

16. The scraper blade of claim 1 wherein the aperture is positioned through the rounded portion of the connecting portion.

17. A scraper blade for a depth-gauge assembly, comprising:
   a connecting portion having an aperture;
   a blade portion connected to the connecting portion;
   wherein the connecting portion and the blade portion are configured to attach to a depth-gauge assembly such that the blade portion is positioned in a gap formed between a pivot hub and a depth-gauge wheel of the depth-gauge assembly;
   wherein the blade portion has a front surface and a back surface with a top edge, a bottom edge, and a side edge, and a second side edge wherein the blade portion has a flat planar profile formed between the front surface and the back surface, and the connecting portion has a front surface and a back surface wherein the connecting portion has a flat planar profile formed between the front surface and the back surface;
   an edge of the connecting portion forms a rounded portion and a narrowing portion on the connecting portion; and
   wherein the narrowing portion of the connecting portion connects directly to the top edge of the blade portion.

18. A scraper blade for a depth-gauge assembly, comprising:
   a connecting portion having an aperture;
   a blade portion connected to the connecting portion;
   a depth-gauge assembly having a pivot hub and a depth-gauge wheel;
   the blade portion attached to the pivot hub, wherein the blade portion extends into a gap formed between an exterior surface of the pivot hub and an exterior contact surface of the depth-gauge wheel.

19. The scraper blade for a depth-gauge assembly of claim 18 wherein the gap is formed within 0.5 inches of the shortest distance between the exterior surface of the pivot hub and the exterior contact surface of the depth-gauge wheel.

20. The scraper blade for a depth-gauge assembly of claim 18 wherein the blade portion extends perpendicularly from a top edge to a bottom edge in relation to a plane extending through a closest point of the exterior contact surface of the depth-gauge wheel to a bottom edge of the blade portion, such that during operation the blade portion engages accumulated soil and debris perpendicularly.

\* \* \* \* \*